United States Patent
Bonzom et al.

[15] 3,676,442
[45] July 11, 1972

[54] SYNTHESIS OF PYRAZINES

[72] Inventors: Albert Bonzom, Rosendael; Bernard Tramier, Marseille, both of France

[73] Assignee: Societe Nationale des Petroles D'Aquitaine, Tour Aquitaine, Courbevoie, France

[22] Filed: Nov. 21, 1969

[21] Appl. No.: 878,941

[30] Foreign Application Priority Data

Nov. 22, 1968 France..............................68174829

[52] U.S. Cl. .......................................260/250 R
[51] Int. Cl. .........................................C07d 51/76
[58] Field of Search ...............................260/250 R

[56] References Cited

UNITED STATES PATENTS 3,453,278   7/1969   Ellis....................................260/250 R

*Primary Examiner*—Nicholas S. Rizzo
*Attorney*—Cushman, Darby & Cushman

[57] ABSTRACT

Hydrocarbon substituted pyrazines are prepared by the reaction of an ammonium compound having $NH_4$ or $NH_2$ groups with an acetylene compound having an oxygen atom linked to the acetylenic unit, the reaction being conducted in an acid medium, preferably containing formic acid or a formate.

12 Claims, No Drawings

SYNTHESIS OF PYRAZINES

The invention relates to a new process for the synthesis of substituted pyrazines, and more particularly of those of which the carbon atoms in the 2 and 6-positions or 2, 3, 5 and 6-positions carry hydrocarbon substituents.

Pyrazine and its derivatives are used in various industries and constitute chemical products of considerable value; it is particular known that these substances are used to a very large extent as pharmaceutical products, as sensitizers for photographic emulsions (I. KREMBS - Chem. Rev. 1947, 40, 279-358), starting materials for the preparation of corresponding acids, of which use is made for obtaining the amides (against Koch bacillus), the hydrazides (analeptics), the polyesters, polyamides, sulphamides, etc. On the other hand, piperazines are obtained by reduction of pyrazines.

It is thus desirable to have available a practical process which is capable of providing pyrazines in an economic manner. However, the existing processes leave much to be desired from this point of view, and especially as regards the production of disubstituted and tetra-substituted pyrazines; in actual fact, the known methods give these two types of derivatives with low yields. This is the case particularly with the condensation of amino ketones on themselves, in basic medium, or the condensation of $\alpha$-diketones with $\alpha$-diamines, or even the reaction of ammonia with $\alpha$-halogenated ketones. As regards the condensation in vapor phase of acrolein with ammonia, this leads to the 2,5-dimethyl pyrazine, of which the 2,6-isomer represents a by-product which is produced in very sparing quantities and is difficult to separate. As a consequence, the disubstituted and tetrasubstituted pyrazines and particularly the 2,6dialkyl pyrazines are very costly.

The present invention provides a new process which permits the aforementioned derivatives to be obtained in a more practical manner with good yields. It is based on the use of certain acetylene compounds, which are becoming increasingly accessible at the present time.

The new process consists in causing the reaction, in acid medium, of an ammoniacal derivative with an acetylene compounds of which the carbon atom in the $\alpha$-position of the triple bond carries an oxygen atom connecting it to another grouping or atom.

One very important characteristic of the invention consists in the presence of formic groups in the reaction medium, thus ensuring a good yield of substituted pyrazine.

Ammoniacal derivative is any compound containing $-NH_2$ groups, particularly $-CONH_2$ or $-NH_4$ groups, whether free or combined, such as amides, ammonium salts, ureas, etc. In view of the particular advantage of having groups derived from formic acid or HCOOH itself in the reaction medium, the preferred ammoniacal derivative is ammonium formate; formamide is also suitable, but it is desirable to use it concurrently with formic acid.

The acetylene compounds which can be used according to the invention can be represented by the general formula:

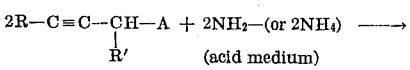

in which R and R', similar or different, are hydrogen atoms or hydrocarbon radicals, particularly alkyls, cycloaklyls, aryls, aralkyls, alkaryls, which are possibly substituted with non-labile groups in acid medium, as for example halogens; the process is especially suitable in those cases where R and/or R' are hydrogens or linear or branched alkyls from $C_1$ to $C_{18}$.

The symbol "A" represents a group such as —OH, —OOCR", —$SO_2R"$, etc., R" being any aliphatic or aryl radical capable of forming the residue of an organic acid; in general terms, "A" is a group having an oxygen atom bonded to the carbon in the $\alpha$-position with respect to the triple bond.

Among the acetylene compounds which can be most usually employed are the $\alpha$-acetylene alcohols (A being OH) and their esters (A being —OOCR"). As non-limiting examples, it is possible to mention the alcohols having 3 to 16 carbon atoms; prop-1-yn-3-ol (propargyl alcohol), but-1-yn-3-ol, pent-1-yn-3-ol, non-1-yn-3-ol, hex-1-yn-4-ene-3-ol, ethynyl phenyl carbinol, ethynyl orthochlorophenyl carbinol, 4-phenyl-but-1-yn-3-ol, 1,4-diphenyl-but-1-yn-3-ol, 1-phenyl-pent-1-yn-3-ol, etc. Examples of esters are provided by the carboxylic acid esters, more especially aliphatic, cycloaliphatic, aromatic, araliphatic or heterocyclic carboxylic acid esters, or mineral acids, of the aforementioned acetylene alcohols. It is thus possible, inter alia, to use the acetates, propionates, butyrates, benzoates, benzene sulphonates, sulphates, phosphates, etc. of prop-1-yn-3-yl, but-1-yn-3-yl, pent-1-yn-3-yl, ethynyl phenyl or any other acetylene radical in the 1,3-position. However, since the formation of the pyrazine is greatly assisted by the formic groups, the preferred method of procedure, when esters are used, consists in taking as starting material the formate of the selected acetylene radical.

Bearing in mind the symbols A, R and R' as defined above, the reaction according to the invention can be summarily written:

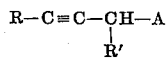

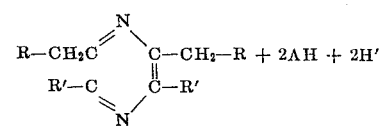

The acid medium necessary for the reaction represents at the same time the solvent of the initial materials, it is possible to use various acids, for example, acetic acid and especially formic acid, but particularly interesting results are obtained with anhydrous polyphosphoric acid. Another solvent is, for example, hexamethyl phosphotriamide.

The concentration of the reactants in their acid solution is generally of the order of 10 to 70 percent and usually about 30 to 60 percent by weight. The proportion of ammoniacal derivative is stoichiometric or in excess with respect to the acetylene compound.

When the formic acid is added to the reaction medium, its preferred proportion is higher than 1 mole per mole of acetylene compound.

The formation of substituted pyrazines according to the invention is catalyzed by metal salts, particularly mercury salts. It is possible to employ a salt with a monovalent or polyvalent anion, for example, chloride, bromide, sulphate, phosphate formate, acetate, propionate, oxalate, tartrate, etc., but this list is not in any way limiting.

Depending on the nature of the reactants being used, the reaction takes place at a temperature which can vary, for example, between 50° and 200° C and usually from 100° to 150° C.

In order to avoid the polymerization of the acetylene compound, it is advisable to effect the operation according to the invention in the presence of a small proportion of a polymerization inhibitor as known per se.

It is to be pointed out that the general conditions concerning formation of the substituted pyrazines are very similar to those of the preparation of oxazoles, starting from alcohols or acetylene esters and amides or ammonium salts. However, although the production of pyrazine is favored, to the detriment of oxazole, by the presence of formic groups and ammonium salts, the oxazole predominates if an is used amide as ammoniacal derivative, in the absence of formic acid.

In conclusion, as will be apparent from the examples which are given below, the best yields of polysubstituted pyrazine are obtained from starting materials which are formed of an acetylene ester and an ammonium salt to which formic acid is added, or the ester and ammonium formate.

The methods of preparation which formed the subject of the following non-limiting examples were carried out in the following manner. Into a three-necked spherical flask, equipped with an agitator, a thermometer and a reflux condenser, were introduced approximately 200 g of polyphosphoric acid (anhydrous; 115% $H_3PO_4$) and 1 mole of ammonium salt or formamide, depending on circumstances. In some of the preparation methods, where a carboxylic acid was added (formic acid or acetic acid), the quantity of the latter was 1.8 moles. Thereafter, at a temperature from 50° to 90° C, there was added a mixture, prepared in the cold, of 1 mole of acetylene alcohol or corresponding ester, with 20 g of mercuric sulphate; this addition was effected in small portions so as to avoid a violent reaction. The mixture obtained was then heated under reflux for 4 to 8 hours.

EXAMPLES 1 to 7

Preparation of 2,6-dimethyl pyrazine

In the Examples 1 to 4, the initial acetylene compound was propargyl alcohol, that is to say, prop-1-yn-3-ol, while the prop-1-yn-3-yl formate was employed in Examples 5 to 7. In the following table, the yields in percent, calculated on the acetylene compound, are indicated by two values, which are respectively the lowest and the highest found in each series of tests.

The yields of 4-methyl-oxazole, formed at the same time as the pyrazine, are indicated in the column "M-4-O."

TABLE I

| Acetylene ex. compound derivative | $NH_3$ | Acid | Yields % "M-4-O" | Pyrazine |
|---|---|---|---|---|
| 1 | alcohol formamide | HCOOH | 1—4% | 9–11% |
| 2 | " " | — | traces | traces |
| 3 | " $NH_4$ formate | HCOOH | 1–2% | 15–25% |
| 4 | "(+hydroquinone) | " | 1–2% | 12–15% |
| 5 | formate formamide | — | 7–10% | 2–3% |
| 6 | " $NH_4$ formate | — | 2–3% | 15–17% |
| 7 | " $NH_4$ formate | HCOOH | 2–3% | 8–15% |

The 2,6-dimethyl pyrazine was extracted with ether from the reaction medium. For this purpose, the latter was first of all neutralized with concentrated potash and subjected to continuous extraction with ether. After 6 hours, the ethereal phase was dried over anhydrous magnesium sulphate and distilled. The fraction containing the 4-methyl oxazole passes over between 78° and 82° C; all that which passes over above 90° C is eliminated, and the 2,6-dimethyl pyrazine is obtained, boiling at 150°–152° C.

EXAMPLES 8 to 20

Preparation of 2,3,5,6-tetramethyl pyrazine

The operating procedure was the same as for the preceding examples, but starting from the but-1-yn-3-ol alcohol, the formate or acetate of but-1-yn-3-yl. The yields of 4,5-dimethyl oxazole (DMO) and/or trimethyl oxazole (TMO) are also indicated, the formation thereof occurring at the same time as that of the tetramethyl pyrazine.

TABLE II

| No. | Acetylene Compound | $NH_3$ derivative | Acid | Yields % DMO and/or TMO | pyrazine |
|---|---|---|---|---|---|
| 8 | alcohol | formamide | — | 12–14 | — traces |
| 9 | " | " | HCOOH | 5–10 | — 40–47 |
| 10 | " | "(+hydroquinone) | HCOOH | 6–8 | — 60–62 |
| 11 | " | " $NH_4$ formate | — | 2–5 | — 56–57 |
| 12 | " | " | HCOOH | 6–8 | — 45–46 |
| 13 | formate | formamide | — | 50–60 | — 3–6 |
| 14 | " | " | HCOOH | 4–6 | — 57–58 |
| 15 | " | $NH_4Cl$ | — | traces | traces |
| 16 | " | " | HCOOH | 8–10 | — 50–53 |
| 17 | " | $NH_4$ formate | — | 2–3 | — 70–73 |
| 18 | " | " | HCOOH | 7–9 | — 55–59 |
| 19 | " | urea | HCOOH | 1–2 | — 28–31 |
| 20 | acetate | $NH_4$ formate | HCOOH | — | 20–22 41–42 |

At the end of each operation, after the neutralization of the reaction medium, the tetramethyl pyrazine is separated by filtration; recrystallized from water and dried, it has a melting point of 86° C. Examples 1 to 20 show how it is possible to direct the reaction at will towards obtaining a substituted pyrazine or a substituted oxazole. They also prove that the yields with a butyne derivative are better than when starting with the corresponding propyne compound.

EXAMPLE 21

Under the conditions of Example 3, pent-1-yn-3-ol, used in place of propargyl alcohol, produced 3,5-diethyl-2,6-dimethyl pyrazine with a yield of 22 percent calculated on the alcohol.

Example 22

Operating as in Example 3, but starting with phenyl ethynyl carbinol, the 3,5-diphenyl-2,6-dimethyl pyrazine was obtained with a yield of 32 percent calculated on the carbinol.

We claim:

1. A process for the preparation of hydrocarbon substituted pyrazine comprising reacting a compound selected from the group consisting of formamide, ammonium salts and urea in an acid solvent selected from the group consisting of formic acid, acetic acid, polyphosphoric acid and hexamethylphosphotriamide, with an acetylene compound of the formula:

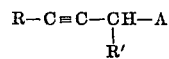

wherein
R and R' are independently selected from the group consisting of hydrogen, alkyl having from one to 18 carbon atoms, phenyl and chlorophenyl, and
A is selected from the group consisting of —OH and the formate, acetate, propionate, butyrate, benzoate, benzene sulfonate, sulfate and phosphate esters thereof, at a temperature from about 50° to about 200° C.

2. The process according to claim 1 wherein the acetylene compound is an alk-1-yn-3-yl containing three to 16 carbon atoms.

3. The process according to claim 1 wherein the reaction medium contains a mercuric salt selected from the group consisting of chloride, bromide, sulfate, phosphate, formate, acetate propionate, oxalate and tartrate, as a catalyst.

4. The process according to claim 1 wherein the acid solvent contains formic acid and the ammonium derivative is formamide or urea.

5. The process according to claim 1 wherein the ammonium salt is formate-free and the solvent includes formic-acid.

6. The process according to claim 1 wherein the acetylene compound is an alk-1-yn-3-ol having from three to 16 carbon atoms.

7. The process according to claim 1 wherein the acetylene compound is a formate of alk-1-yn-3-yl containing three to 16 carbon atoms.

8. The process according to claim 2 wherein said acetylene compound is prop-1-yn-3-yl, but-1-yn-3-yl, pent-1-yn-3-yl or phenyl ethynyl carbinyl formate.

9. The process according to claim 1 wherein the reaction medium contains at least 1 mole of formic acid per mole of acetylene compound.

10. The process according to claim 1 wherein the proportion of ammonium derivative to acetylene compound is at least 2:1.

11. The process according to claim 1 wherein the concentration of reaction materials in the reacting medium is from about 10 to about 70 percent by weight.

12. The process according claim 1 wherein the acetylene compound is selected from the group consisting of propargyl alcohol, propargyl formate, but-1-yn-3-ol, but-1-yn-3-yl formate, but-1-yn-3-yl acetate, pent-1-yl-3-ol and phenyl ethynyl carbinol.

* * * * *